United States Patent [19]

Sourbel et al.

[11] 4,005,617
[45] Feb. 1, 1977

[54] VARIABLE FORCE REDUCING PEDAL CONTROL DEVICE FOR PRESSURE EMITTER

[75] Inventors: Jean-Claude Sourbel, La Garenne-Colombes; Michel Guettier, Rueil Malmaison, both of France

[73] Assignees: Societe Anonyme dite Automobiles Peugeot, Boulogne-Billancourt; Societe Anonyme Dite: Automobiles Peugeot, Paris, both of France

[22] Filed: July 14, 1975

[21] Appl. No.: 595,984

[30] Foreign Application Priority Data

July 18, 1974 France .............................. 74.25072

[52] U.S. Cl. .................... 74/516; 74/518; 74/560
[51] Int. Cl.² ................................... G05G 7/04
[58] Field of Search ............ 74/518, 516, 512, 560

[56] References Cited

UNITED STATES PATENTS

| 3,142,199 | 7/1964 | Burton et al. | 74/516 |
| 3,269,213 | 8/1966 | Buchwald | 74/516 |
| 3,371,486 | 3/1968 | Hager | 74/516 X |
| 3,858,457 | 1/1975 | Mathues | 74/512 |

*Primary Examiner*—Samuel Scott
*Assistant Examiner*—F. D. Shoemaker
*Attorney, Agent, or Firm*—Beveridge, DeGrandi, Kline & Lunsford

[57] ABSTRACT

The present invention relates to a pedal command device with variable reduction for a master-cylinder type pressure emitter. The device includes a pedal articulated on a lever that is pivotally movable about a shaft and recalled by a spring. The pedal includes at one of its ends a cam that actuates a pusher articulated on the lever, which pusher commands a pressure emitter such as a vehicle brake master cylinder by means of a thrust member and a rod.

5 Claims, 1 Drawing Figure

U.S. Patent     Feb. 1, 1977     4,005,617
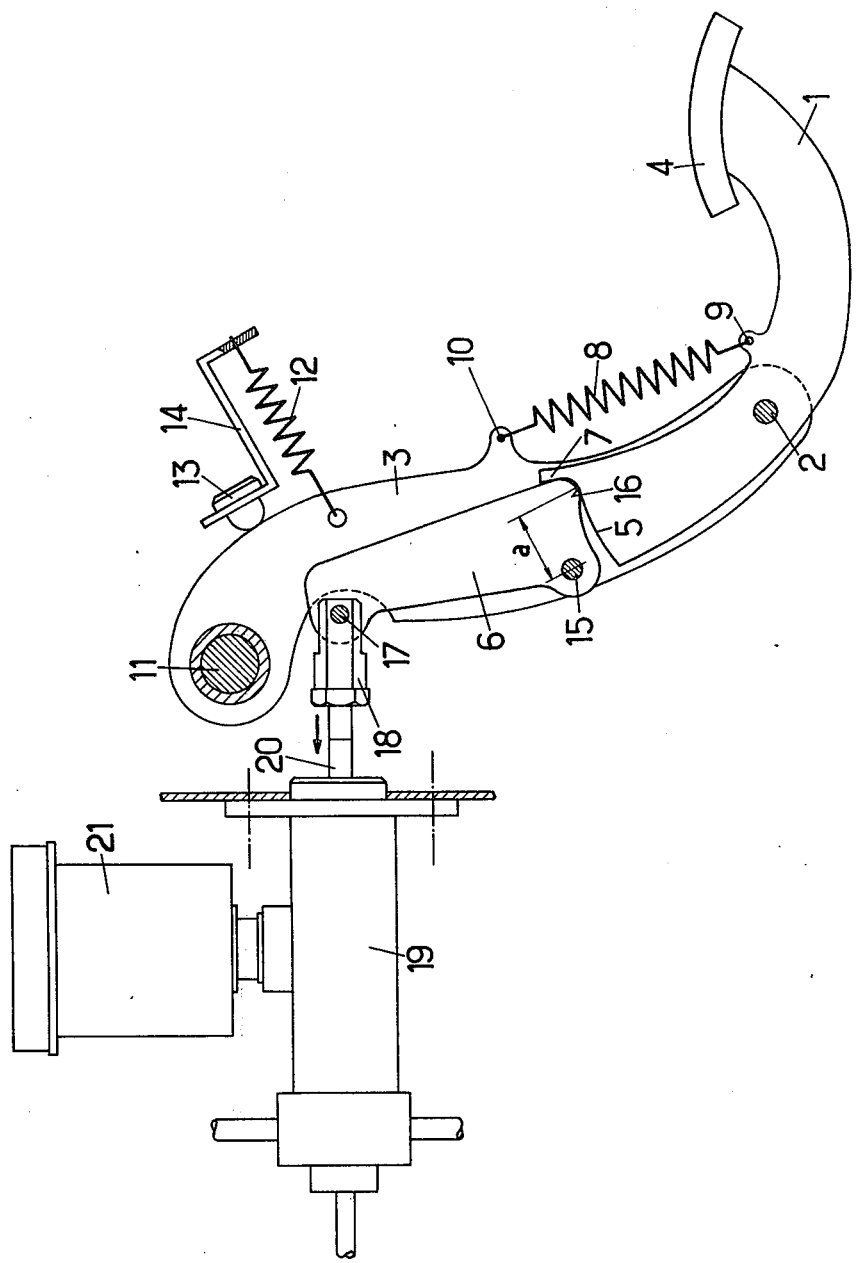

VARIABLE FORCE REDUCING PEDAL CONTROL DEVICE FOR PRESSURE EMITTER

BACKGROUND OF THE INVENTION

1. Field of the Invention

The present invention relates to a variable force reducing pedal control device for master-cylinder type hydraulic pressure emitters. Such a device allows, during the initial stage of movement of the brake pedal, the acceleration of the rate of translation of a master cylinder actuating rod in order to compensate as quickly as possible the brake pedal inertia when the resistant force exerted on the rod is still practically null. In a second stage, when the resistant force exerted on said rod increases beyond a predetermined value, the device which is the subject of the invention then functions as a conventional brake pedal control.

DESCRIPTION OF THE PRIOR ART

In any hydraulic system, especially in command circuits for automotive vehicle brakes, it is important to provide free expansion of the fluid that serves to transmit the pressure exerted on the brake control pedal to the receiving organs such as conventional wheel cylinders, allowing actuation of said brakes. It is for this reason that a channel is generally provided in the body of the master cylinder to allow passage of the hydraulic fluid toward the master cylinder reservoir in case of expansion of the said fluid. It is thus important that the orifice of this channel, opening into the master cylinder, always remain uncovered when the master cylinder is in retracted position. There is therefore safety clearance between this orifice and the master cylinder piston. This clearance extends by so much the stroke of the master cylinder before it can effectively compress the fluid that commands actuation of the brakes. Now, pedal brake controls comprising an actuating rod, connected to a lever made in a single piece, require that this safety clearance be compensated by a certain stroke of the brake pedal. This travel, which has no effect whatsoever on braking, therefore extends by some extent the response time of the brakes when the pedal that commands them is depressed.

SUMMARY OF THE INVENTION

The present invention is intended to remedy such a drawback, by proposing a device whereby the actuating rod connected to a pusher actuated by a cam that is integral with the pedal, moves rapidly in a first phase to compensate the above-mentioned clearance and then more slowly, after all action of the pedal on the pusher has ceased, the device behaves like a conventional pedal type control.

According to the present invention, the variable reduction pedal command device for a master-cylinder hydraulic pressure system comprises a pedal articulated on a lever that is movable about a shaft, said lever being recalled by a spring. Said pedal comprises means for actuating a pusher articulated on said lever, commanding said master cylinder. All relative movements of said pedal with reference to the pusher stop when the resistant force produced by the master cylinder becomes greater than the force exerted by the lever recall spring, the pedal-lever-pusher assembly then acting as a unitary command device articulated about the above-mentioned shaft.

In the command device according to the present invention, the pedal and pusher respectively are in the form of a cam, at the place of their mutual contact, allowing the pedal to actuate said pusher. According to another embodiment of the present invention, said pedal and said pusher may also present, at the point of their mutual contact, meshing toothed gear segments that also allow the pedal to actuate the said pusher.

The command device according to the present invention also preferably comprises a finger, integral with the pedal, which bears against the rear flank of the pusher under the effect of a recall spring disposed between said pedal and said lever.

BRIEF DESCRIPTION OF THE INVENTION

Other special features of the present invention will also be evident from the following description of an example of embodiment that is in no way limitative, of such a variable reduction pedal command of a master-cylinder type pressure emitter, with reference to the attached drawing wherein the single FIGURE represents a view in elevation of the device that is the subject of the present invention.

DESCRIPTION OF THE PREFERRED EMBODIMENT

As it is shown in the FIGURE, the variable reduction pedal command device for a master-cylinder type hydraulic pressure system comprises a pedal 1 articulated substantially at its mid-point, about a shaft 2 that is integral with a lever 3. Said pedal has a shoe 4 at one of its ends, on which shoe the force is exerted that allows actuation of said command device. The other end of said pedal 1 has a cam profile 5. At rest, pedal 1 is applied against a pusher 6 because of a finger 7 that bears on the rear flank of pusher 6. Pedal 1 is recalled to the rest position by a spring 8 which is fixed on the one hand at 9 on said pedal and on the other hand at 10 on said lever 3.

The lever 3 is articulated at its upper end (as viewed in the drawing) about a shaft 11, and is recalled by a spring 12 against a stop 13 fixed on a claw 14, and carries thereon an articulation or pivot shaft 15 situated substantially at an equal distance between and parallel to shaft 11 of lever 3 and shaft 2 of pedal 1. Pusher 6 is articulated at one of its extremities on shaft 15 of lever 3 and is actuated because of its cam profile 16 by cam 5 of pedal 1, through which arrangement, by means of a pivot pin 17, it acts on a thrust element 18 directly commanding master cylinder 19 through a rod 20 that is adjustable with reference to thrust element 18.

The variable reduction pedal command device for a hydraulic pressure system of the present invention functions in the following way: when a force is applied on shoe 4 of pedal 1, as by the foot of a vehicle driver, cam 5 of the pedal acts on the cam 16 to move pusher 6 counterclockwise about the pivot shaft 15. The profile of cams 5 and 16 is such that it allows transmission to pusher 6 of the moment of force exerted by pedal 1. Because the force that pedal 1 exerts on pusher 6 has a reduced lever arm $a$, a slight movement of pedal 1 causes a greater movement of pusher 6, from cams 5 and 16. The ratio of the value of the movements of pedal 1 and pusher 6 is preferably identical to their rate of movement. On the other hand, the ratio of forces exerted on shoe 4 of pedal 1 and by pusher 6 is the inverse of the above-mentioned ratio, i.e., a great force exerted on shoe 4 of pedal 1 furnishes less force on articulation shaft 17 that connects pusher 6 to thrust element 18. There is thus amplification of the speed of actuation of pusher 6 with reference to the speed of actuation of pedal 1, but reduction of the force that pusher 6 exerts on thrust element 18 with reference to the force exerted on shoe 4 of pedal 1. This functioning thus corresponds to the first phase of the actuation of the brakes, in which great rapidity of actuation without force amplification is sought, the resistant force that rod 20 of the piston of master cylinder 19 exerts on pusher 6 that has to be overcome being practically null, because the hydraulic fluid is not compressed but merely driven into reservoir 21 of master cylinder 19.

In the second phase of the use of the device of the present invention, when the resistant force exerted by piston rod 20 of master cylinder 19 for pusher 6 by means of thrust element 18 increases and becomes greater than the recall force exerted by spring 12 on lever 3, all relative motion between pusher 6 and pedal 1 ceases and the assembly constituted by pusher 6, pedal 1 and lever 3 acts as a unit command, pivoting about shaft 11 of lever 3 like a conventional command pedal. The reduction ratio of the command device of the present invention is then substantially modified so that a large relative motion of pedal 1 which is then rigidly connected with lever 3 and pusher 6 causes a relatively small relative motion of piston rod 20 of master cylinder 19. The ratio of movements of pedal 1 and piston rod 20 of master cylinder 19 being equal to the inverse of the ratio of the forces exerted on shoe 4 of pedal 1 and by pusher 6 on rod 20, a relatively small force on shoe 4 of pedal 1 will cause a greater force on piston rod 20 of master cylinder 19, which thus allows a raising of the pressure of the hydraulic fluid that is necessary for braking vehicles equipped with such a device.

When the force exerted on shoe 4 of pedal 1 stops, spring 12 recalls lever 3 to its rest position against stop 13, while spring 8 recalls pedal 1 to a position such that its finger 7 will bear on the rear flank of pusher 6.

It is obvious that such a variable reduction command device is not applicable only to master-cylinder type hydraulic pressure systems, but may also serve for any other uses that require a variation of the reduction ratio as a function of the force applied by the element that will be operated by the above-described device. Accordingly, while we have disclosed and described preferred embodiments of our invention, we wish it understood that we do not intend to be restricted solely thereto, but rather that we intend to include all embodiments thereof which would be apparent to one skilled in the art and which come within the spirit and scope of our invention.

We claim:

1. A pedal control device with variable reduction for a pressure elevator comprising a lever mounted for pivotal movement about a first axis, a pedal pivotally mounted on said lever for movement about a second axis spaced from said first axis, first stop means limiting movement of said lever in one direction and spring means resiliently urging said lever against said first stop means, a pusher member pivotally mounted on said lever for limited movement about a third axis spaced from said first and said second axes, said pusher member being operably connected to the pressure elevator for commanding actuation thereof, and means on said pedal engaging said pusher member for rotating said pusher member about said third axis to thereby apply a force to the pressure elevator upon rotation of said pedal about said second axis, said lever, pedal and pusher acting as a unit pivoted about said first axis and without relative movement therebetween when force applied to the pressure elevator exceeds the resistance of said spring means.

2. The control device as defined in claim 1 wherein said pedal and said pusher member respectively have at the point of their mutual contact a profile in the form of cam surfaces cooperating to pivot said pusher about said third axis upon pivotal movement of said pedal about said second axis.

3. The control device as defined in claim 1 wherein said pedal and said pusher respectively have at their point of mutual contact meshing toothed gear segments whereby movement of said pedal about said second axis rotates said pusher about said third axis.

4. The device as defined in claim 1 further comprising second spring means connected between said lever and said pedal and tending to rotate said pedal about said second axis in a direction opposite to the direction required to rotate said pusher member to apply pressure to said pressure elevator, and second stop means limiting movement of said pedal in said opposite direction.

5. The device as defined in claim 4 wherein said second stop means comprises a finger member integrally formed on said pedal in position to engage a cooperating portion of said pusher member.

* * * * *

UNITED STATES PATENT OFFICE
CERTIFICATE OF CORRECTION

PATENT NO. : 4,005,617
DATED : February 1, 1977
INVENTOR(S) : JEAN-CLAUDE SOURBEL and MICHEL GUETTIER It is certified that error appears in the above-identified patent and that said Letters Patent are hereby corrected as shown below:

This list of assignees should read:

REGIE NATIONALE DES USINES RENAULT, Boulogne-Billancourt;

Societe Anonyme dite: AUTOMOBILES PEUGOT, Paris, both of France.

Signed and Sealed this twelfth Day of July 1977

[SEAL]

Attest:

RUTH C. MASON
*Attesting Officer*

C. MARSHALL DANN
*Commissioner of Patents and Trademarks*